United States Patent [19]
de Gennes

[11] 4,144,957
[45] Mar. 20, 1979

[54] SELF-CENTERING CLUTCH BEARINGS

[75] Inventor: Gérard de Gennes, Senlis, France

[73] Assignee: Societe Anonyme Francaise du Ferodo, Paris, France

[21] Appl. No.: 749,362

[22] Filed: Dec. 10, 1976

[30] Foreign Application Priority Data
Dec. 30, 1975 [FR] France .................. 75 40052

[51] Int. Cl.² .......................................... F16D 13/60
[52] U.S. Cl. ..................... 192/98; 192/110 B; 308/163
[58] Field of Search ............... 192/98, 110 B; 308/233; 248/510; 267/161

[56] References Cited
U.S. PATENT DOCUMENTS

| | | | |
|---|---|---|---|
| 2,660,661 | 11/1953 | Dupler | 248/510 |
| 2,703,737 | 3/1955 | Turner | 308/163 |
| 3,114,388 | 12/1963 | Hoen | 267/161 |
| 3,416,637 | 12/1968 | Maurice | 192/98 |
| 3,741,361 | 6/1973 | Brandenstein | 192/110 |
| 4,029,186 | 6/1977 | de Gennes | 192/98 |

FOREIGN PATENT DOCUMENTS

| | | | |
|---|---|---|---|
| 2242140 | 3/1974 | Fed. Rep. of Germany | 192/98 |
| 2524917 | 2/1976 | Fed. Rep. of Germany | 192/98 |

Primary Examiner—Henry C. Yuen
Attorney, Agent, or Firm—Charles E. Brown

[57] ABSTRACT

A self-centering clutch release bearing comprises an operating element, a drive element having an omnidirectional latitude of radial movement for the self-centering action, a cover axially connecting these elements together, and axially-directed resilient means integrated in the transverse wall of the cover for acting on the drive element. According to the invention, the transverse wall of the cover is provided with support zones which alternate with anchoring zones and which are offset axially in relation thereto, and the cover bears on the drive element only by its support zones.

22 Claims, 16 Drawing Figures

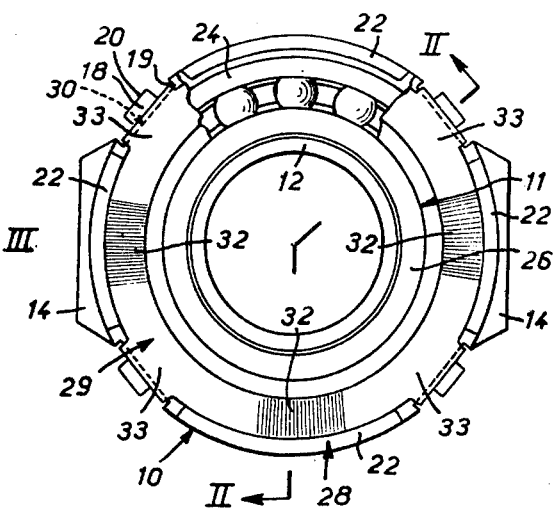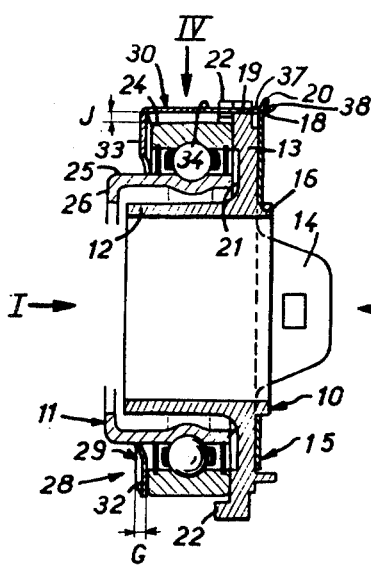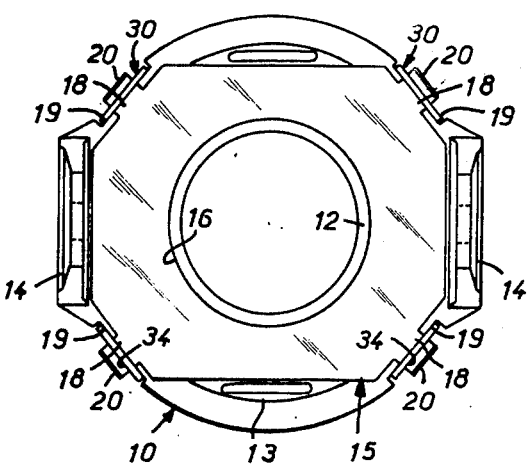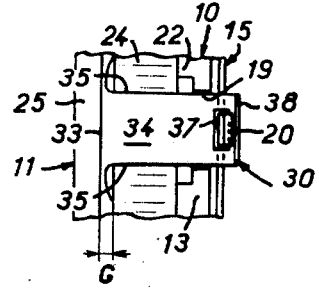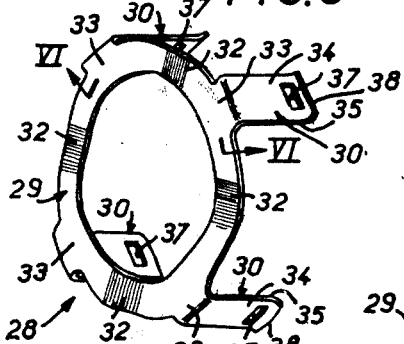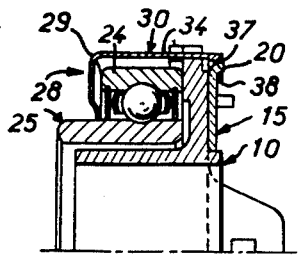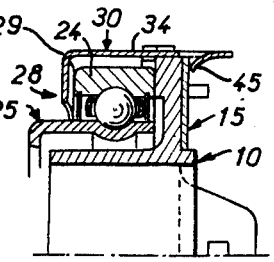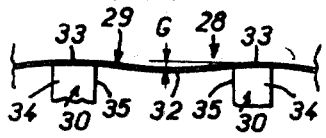

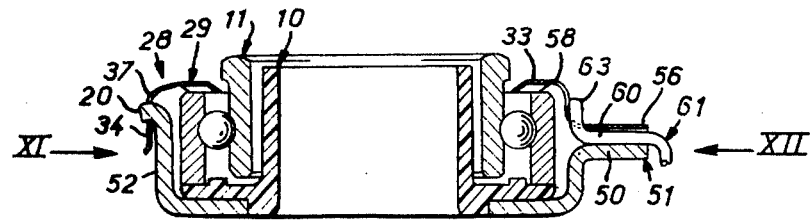
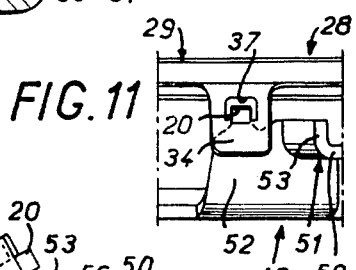
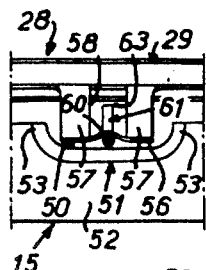
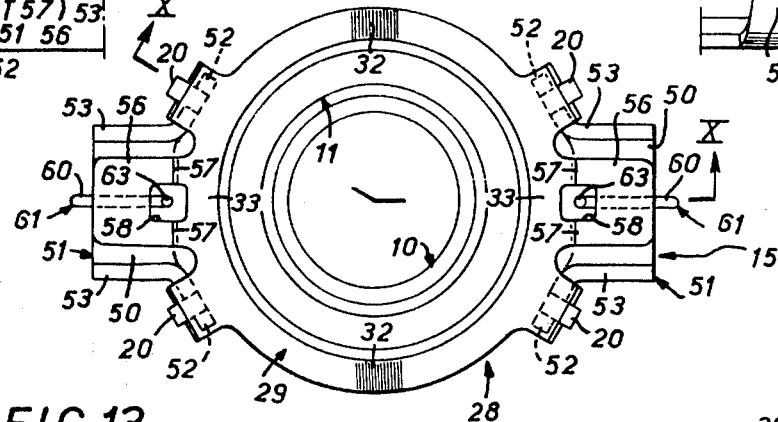
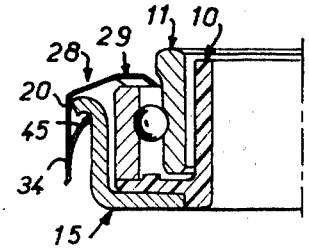
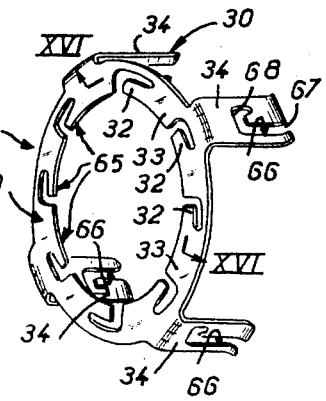
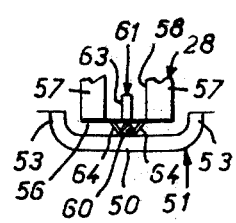
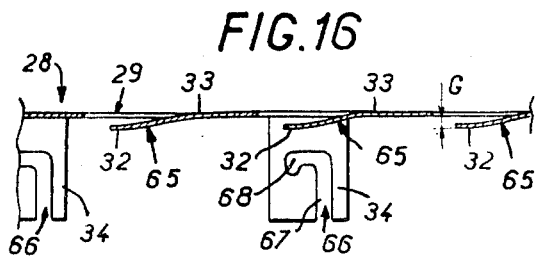

SELF-CENTERING CLUTCH BEARINGS

BACKGROUND OF THE INVENTION

The present invention relates generally to "self-centering" clutch release bearings which comprise an operating element intended to be subjected to the action of a displacement control means and having a transverse annular plate or flange sometimes known as a cage, a drive element intended to act on the release device of a clutch under the action of the operating element, and having radially an omnidirectional latitude of movement in relation to the operating element to provide the self-centering action, axially-directed resilient means urging the drive element in the direction of the transverse plate of the operating element, and a cover which fastens together the operating element, the drive element, and the resilient means.

The term "cover" used herein refers to a part having the general shape of a bowl having an aperture in the base and which thus comprises a transverse wall by which the cover bears against the drive element, and a peripheral skirt by which the cover is connected axially to the operating element.

As is known, the radial, omnidirectional latitude of movement possessed by the drive element of such a clutch relative to the bearing operating under the control of axially-directed resilient means acting on the aforesaid drive element has the result and the advantage of enabling the drive element to take up the correct operating position coaxially with the clutch which it operates, and of remaining in that position even if, during the assembly of the clutch release bearing to which it belongs, this drive element is not exactly aligned coaxially with the clutch.

Various important requirements have to be fulfilled in the construction of a self-centering clutch release bearing of this kind, particularly with regard to simplicity of construction, in order to reduce the cost of the bearing, and in respect of dimensions in order to reduce the space occupied particularly with regard to certain radial dimensions.

For the purpose of meeting the first of these requirements, it has already been proposed to shape the transverse or front wall of the cover in such a manner that this wall can itself constitute the axially-directed resilient means provided for urging the drive element in the direction of the transverse flange of the operating element, this drive element bearing directly against the flange or through a friction washer interposed between it and the plate. This results in the reduction of the number of parts to be made and to be assembled in order to form the bearing in question, and therefore in a reduction in costs.

However, in this construction, the transverse wall of the cover of this bearing is as a whole shaped in axial half-section in the form of a bishops crook, and bears against the drive element along a circularly continuous support line. This arrangement is very suitable for a cover made of synthetic material, and it was precisely for a construction of this kind that it was proposed. It is not however suitable when the cover is made of metal in the conventional way.

The main object of the present invention is to provide a self-centering clutch bearing of the kind briefly described above, in which the axially-directed resilient means are formed by the transverse wall of the cover, and which allow the cover to be made of metal or of synthetic material as desired.

SUMMARY

According to the invention, a clutch bearing of the kind described is characterised in that the transverse wall of its cover comprises, circumferentially, at least two support zones which alternate with anchoring zones, the support zones being axially offset in relation to the anchoring zones and the said transverse wall bearing against the drive element only by its aforesaid support zones.

According to a preferred embodiment, each support zone is formed by the median portion of a resiliently axially deformable undulation formed in the transverse wall of this cover.

In an alternative embodiment, a support zone of this kind may be formed by the free end of a resiliently axially deformable tongue cut out circumferentially from the transverse wall of the cover.

However this may be, the number of parts necessary for the construction of a bearing of this kind it thus advantageously reduced, and as a result the bearing complies with the requirement of simplicity mentioned above. In addition, the bearing construction fulfills the requirement regarding its external dimensions also referred to above.

It is in fact very suitable for the preferred arrangement in which the peripheral skirt of the cover is reduced to two or more legs which extend axially from the transverse wall of the cover and which alternate circumferentially with gaps.

This results in a reduction of the overall diametrical dimensions of the bearing at the said gaps, and allows ventilation of the interior of the bearing through these gaps, which is favourable to the cooling of the bearing during operation.

BRIEF DESCRIPTION OF THE DRAWINGS

FIG. 1 is a front elevational view of the clutch bearing of the invention in the direction of the arrow I in FIG. 2, with parts broken away;

FIG. 2 is a view in axial section of this clutch bearing along the broken line II—II in FIG. 1;

FIG. 3 is a rear elevational view thereof in the direction of the arrow III in FIG. 2;

FIG. 4 is a partial plan view thereof in the direction of the arrow IV in FIG. 2;

FIG. 5 is a view in perspective of the cover provided for a clutch bearing of this kind;

FIG. 6 is a partial view in circumferential section, assumed to be developed flat, on the line VI—VI in FIG. 5, of the cover in question;

FIGS. 7 and 8 are axial half-sections similar to that of FIG. 2, each relating respectively to a modified embodiment;

FIG. 9 is a front elevational view similar to that in FIG. 1 and relates to another modified embodiment;

FIG. 10 is a view in axial section of the modified embodiment shown in FIG. 9, on the broken line X—X in FIG. 9;

FIGS. 11 and 12 are partial side views of this modified embodiment, viewed respectively in the direction of the arrows XI and XII in FIG. 10;

FIG. 13 is a partial view in axial section similar to that in FIG. 10 and relates to another modified embodiment;

FIG. 14 is a partial side view similar to that in FIG. 12 and relates to another modified embodiment; and FIGS. 15 and 16 are views similar to those in FIGS. 5 and 6 respectively and relate to a modified construction of the cover which can be used in a clutch bearing according to the invention.

DESCRIPTION OF THE PREFERRED EMBODIMENTS

According to the embodiment illustrated in FIGS. 1 to 6, the clutch bearing according to the invention comprises generally, and in known manner an operating element 10 intended to be subjected to the action of a displacement control means (not shown), which in practice is a clutch release fork, and a drive element 11 which is intended to act on the release device of the clutch (likewise not shown) under the action of the operating element 10.

Where the operating element 10 is made in one piece from a synthetic material, for example by moulding, it comprises an axial guide sleeve 12 and an annular transverse support flange 13 extending radially beyond the sleeve 12, slightly set back in relation to one axial end of the said sleeve, which will hereinafter be referred to as the rear end.

On the corresponding rear face of the flange 13, which the face opposite to the face where the drive element 11 is disposed, project two lugs 14 located at two diametrically opposite points on the outer periphery of the said flange, these lugs 14 are intended for fastening the bearing to the displacement control means.

For supporting the displacement control means, the flange 13 is lined on its rear face with a reinforcement plate 15, preferably made of metal.

In its median zone this reinforcement plate 15 has a circular aperture 16 by which it is engaged over the end of the sleeve 12 which projects from the rear face of the flange 13, this end thus serving for centering the reinforcement plate 15 in relation to the flange 13 and advantageously extending beyond the flange, thus increasing to a corresponding extent the bearing area of the sleeve on the guide hub (not shown) to which it is to be attached.

At four diagonally opposite points the reinforcement plate 15 has extensions 18 which, by virtue of cutouts 19 provided axially on the edge of the outer periphery of the flange 13, extend radially beyond the corresponding part of the flange.

For reasons which will appear later on, each free end of these extensions 18 forms a fastening claw 20, and in the example shown in FIGS. 1 to 6, these claws are at least partly curved over axially in the opposite direction to the drive element 11.

On its front face corresponding to the drive element 11 the flange 13 has an annular cavity 21 on its inner periphery. On this same front face the flange 13 carries on its outer periphery a projecting annular rim 22.

In known manner, the drive element 11 is a ball bearing.

In the example illustrated, this ball bearing bears directly by its outer race 24 against the front face of the flange 13, beyond the annular cavity 21 provided in its front face.

In the example illustrated the outer race 24 of the ball bearing 11 is a cut-out part; the inner race 25 of this ball bearing is a part produced by stamping and/or rolling, its front end extending beyond the corresponding end of the associated outer race 24 and constituting a rolled support edge 26 suitable for enabling the drive element 11 to bear against the clutch release device.

Finally, also in known manner, a cover or connecting member 28 is provided which is suitable for axially fastening together the operating element 10 and the drive element 11; this cover 28 comprises a transverse wall 29 whose overall shape is such as to enable it to form by itself an axially acting resilient means suitable for urging the drive element 11 in the direction of the flange 13, the said wall 29 bearing against the outer race 24 of the ball bearing, and a peripheral skirt 30 which extends radially at a distance from the drive element 11. An annular clearance J is provided between this peripheral skirt 30 and the drive element 11, and this skirt axially connects the cover 28 to the operating element 10, or more precisely, in the example illustrated, to the reinforcement plate 15 lining the rear face of the flange 13.

According to the invention, the transverse wall or endwall 29 of the cover 28 comprises, circumferentially, at least two support zones 32 which alternate with anchoring zones 33 and which are offset axially in relation to the latter by a distance G, the said transverse wall 29 bearing against the outer race 24 of the ball bearing by its support zones 32 only.

In the example illustrated, and as can best be seen in FIG. 5, the peripheral skirt 30 of the cover 28 is reduced to at least two legs or tabs 34 which extend axially from the transverse wall of the cover and which alternate circumferentially with gaps 35.

In the example illustrated in FIGS. 1 to 6, these legs 34 are four in number and are regularly distributed peripherally, each being positioned to correspond to a cutout 19 on the outer peripheral edge of the flange 13 so as to co-operate, beyond the said flange, with the corresponding fastening claw 20 formed by the free end of the corresponding radial extension of the rear reinforcement plate 15 associated with the flange 13.

For this purpose each leg 34 of the cover 28 is provided near its free end with a cutout 37 adapted to engage over the corresponding fastening claw 20.

In the example illustrated in FIGS. 1 to 6, the free end 38 of an axial leg 34 of the cover 28 is in addition at least partly bent over radially in the opposite direction to the axis of the assembly.

In the arrangement illustrated in FIGS. 1 to 6, the support zones 32 formed circumferentially in the transverse wall 29 of the cover 28 are four in number, each of these support zones being formed by the median portion of an axially resiliently deformable undulation assumed circumferentially by this transverse wall 29 between two axial legs 34, the anchoring zones 33 associated with the support zones 32 being in turn formed by the portions of the transverse wall 29 to which the axial legs 34 are joined.

As will be apparent, the clutch release bearing of the invention can be easily assembled once the drive element 11, the operating element 10, and the reinforcement plate 15 associated with the flange 13 have been aligned axially, by simply clipping the cover 28 axially over the reinforcement plate 15: the free ends 38 of the axial legs 34 of the cover 28 are first brought into a position facing the radial extensions 18 of the reinforcement plate 15, and then are pushed axially so as to come into contact with the fastening claws 20 constituting the ends of the radial extensions 18 of the reinforcement plate 15, this movement being continued until the axial legs 34 are elastically deformed and their free ends 38 clear the fastening claws 20 and, when they return to their elastic configuration, the axial legs 34 are engaged by their cutouts 37 over the claws 20.

In a modified embodiment (not shown), the number of axial legs 34 of the cover 28 is reduced to two, and one of these axial legs is immediately engaged by its cutout 37 over the corresponding fastening claw of the reinforcement plate 15, the cover 28 being situated askew, and the cover is then straightened until by a clipping action the other axial leg 34 engages — by a similar process to that described above — by its cutout 37 on the corresponding fastening claw 20 of the reinforcement plate 15.

Whatever the method of engagement, the cover 28 and the reinforcement plate 15 together grip the drive element 11 and the operating element 10; due to the undulations with which it is formed, the transverse wall 29 of the cover 28 elastically presses the outer race 24 of the ball bearing constituting the drive element 11 against the transverse flange 13 of the operating element 10, while by its axial legs 34 the cover 28 secures the reinforcement plate 15, which lines its rear face, to the flange 13.

Because of the radial clearance J provided between the drive element 11 and the axial legs 34, which in the example illustrated constitute the peripheral skirt 30 of the cover 28, the drive element 11 has in relation to the flange 13 an omnidirectional latitude of radial movement in a transverse plane defined by the front face of the flange 13, and this movement is controlled by the axially-directing resilient means constituted by the transverse wall 29 of the cover 28, while being limited radially by the retaining rim 22 projecting from the front face of the flange 13 on its outer periphery in the example illustrated.

Between two anchoring zones 33, each support zone 32 acts axially resiliently as a beam fixed at its two ends.

As will have been observed, the overall size of this bearing is small; more precisely, its diametrical size is reduced, between the axial legs 34 of the cover 28, solely to the diametrical dimension of the ball bearing constituting the drive element 11, (with the addition of the radial deflection of the bearing) for the corresponding front portion of the clutch bearing, thus facilitating its installation.

In addition, as will have been understood, the fact that the ends 38 of the axial legs 34 of the cover 28 are bent over radially facilitates the clipping of this cover over the reinforcement plate 15, and the fact that the corresponding fastening claws 20 of this plate are in turn bent over towards the rear advantageously strengthens this clipping action and makes it perfectly secure.

Finally, as will also have been realised, the cover 28 may advantageously be of metal.

In the modified embodiment illustrated in FIG. 7 the free end 38 of a fastening leg 34 of the cover 28 is bent over radially in the direction of the axis of the assembly by folding after assembly, and it is in the portion of this end which is thus bent over radially that the cutout 37 is provided, by which this leg 34 is engaged over the corresponding fastening claw 20 of the rear reinforcement plate 15.

Furthermore, in this modified embodiment the inner race 25 of the ball bearing constituting the drive element 11 is a cut-out part, like the outer race 24.

In the modified embodiment illustrated in FIG. 8, the peripheral skirt 30 of the cover 28 is provided near its free end with at least two resiliently deformable tongues 45, which project obliquely and which extend radially towards the axis of the assembly and axially towards the transverse wall 29 of the cover; these tongues co-operate with a fastening surface on the operating element 10, this fastening surface being in the example illustrated the rear face of the reinforcement plate 15.

Likewise in the example illustrated, for which as previously described the peripheral skirt 30 of the cover 28 is reduced to the axial legs 34, each of these legs carries a resiliently deformable tongue 45 near its free end.

As in the embodiment described in connection with FIGS. 1 to 6, this modified embodiment is assembled by clipping.

In the embodiment illustrated in FIGS. 9 to 12, the lateral extensions of the reinforcement plate 15 which are provided for the purpose of fastening the cover 28 extend not only radially but also axially in the direction of the transverse wall 29 of the cover.

Furthermore, in the case of a clutch release bearing on which springs adapted to fasten the bearing to the associated displacement control means must be permanently held, the reinforcement plate 15 is provided laterally, in diametrically opposite positions, with radially projecting wings 50.

In practice, and as illustrated, these radial wings 50 form the bottom of channel-shaped extensions 51, each of which is disposed between two radial and axial extensions 52 intended for engaging the cover 28 and whose rims 53 form the continuation of the corresponding axial and radial extensions 52.

The two axial and radial extensions 52 which frame the same extension 51 are in line with one another so that the whole arrangement partly encloses the corresponding periphery of the ball bearing constituting the drive element 11.

As previously, the axial and radial extensions 52 of the reinforcement plate 15 each end in a fastening claw 20 on which can be engaged the corresponding axial leg 34 of the cover 28, for which purpose use is made of the cutout 37 provided near the free end of the leg.

In the example illustrated, the transverse wall 29 of the cover 28 forms only two support zones 32 in an axial plane of symmetry in relation to the axial legs 34, which are grouped in pairs and at a point corresponding to which the corresponding anchoring zones 33 are formed, so that the wall 29 has the general form of a channel or gutter.

In addition, between each pair of axial legs 34 and in positions corresponding to the wings 50, the cover 28 in turn has radial wings 56 each of which is carried at the end of two radial legs 57 forming a space 58 between them, and which are each directed oppositely to the axis of the assembly.

In the example illustrated in FIGS. 9 to 12, a wing 56 of this kind is shaped as a channel in its median zone, and in co-operation with the corresponding radial wing 50 of the reinforcement plate 15, it is thus able to hold in position the rectilinear end portion 60 of a spring 61 formed from round wire.

In the drawings the round wire spring 61, which is provided in order to permit the fastening of the bearing to the associated displacement control means, is represented only by its end portions 60.

Each of these end portions terminate in a right-angle return 63 which passes through the space 58 separating two corresponding axial legs 57 of the cover 28, thus effecting the lateral location of the spring 60.

In the modified embodiment illustrated diagrammatically in FIG. 13, each axial leg 34 of the cover 28 is provided with a resiliently deformable tongue 45 in an arrangement similar to that described with reference to FIG. 8, for co-operation with the corresponding fastening claw 20 of the reinforcement plate 15.

In the modified embodiment illustrated in FIG. 14, the radial wings 56 of the cover 28 are rectilinear, and each of them carries two tongues 64 which together originate from a slot provided for the purpose in the said wing, and which are adapted to grip the corresponding rectilinear end portion 60 of the spring 61.

In the modified embodiment illustrated in FIGS. 15 and 16 a support zone 32 of the cover 28 is formed by the free end of an axially resiliently deformable tongue 65 cut out circumferentially from the transverse wall 29.

For this purpose, each of these wings is deformed in such a manner as to have a point of inflection between its associated anchoring zone 33 which is formed by the corresponding part of the transverse wall 29 of the cover 28 from which it originates, and its free end 32.

In this same embodiment, the peripheral skirt 30 of the cover 28 is provided at its free end with at least two slots 66 adapted to permit its mounting by a bayonet connection onto the operating element 10.

Since in the example illustrated, and as previously described the construction is one in which the peripheral skirt 30 of the cover 28 is advantageously reduced to axial legs 34, each of these axial legs 34 has near its free end a slot 66 suitable for mounting by a bayonet connection.

In known manner, a slot of this kind comprises an engagement end 67 leading to the outside followed by a retaining end 68 which is circumferentially and axially offset in relation to the engagement end 67.

A slot 66 of this kind is intended for co-operation with a complementary pin (not shown) formed on the operating element 10 or on the reinforcement plate 15 fastened to the operating element 10 by the cover 28.

The present invention is moreover not limited to the embodiments described and illustrated but includes any modified embodiments and/or combination of their various elements within the scope of the appended claims.

In particular, the number of support zones provided on the transverse wall of the cover of the bearing may be varied as desired.

In addition, the drive element need not necessarily bear directly on the transverse flange of the operating element; if necessary, a friction washer may be interposed, particularly in cases where this transverse flange is not made of synthetic material; with this latter arrangement, the reinforcement plate associated with one face of this transverse flange can be dispensed with.

Finally, the guide sleeve to which this transverse flange is fastened is also itself not necessarily indispensable. In certain applications it may be considerably reduced or even eliminated.

I claim:

1. A clutch release bearing comprising an operating element having means for cooperation with clutch control means and a radially extending annular flange, a drive element having means for cooperation with a clutch release member, said clutch release bearing having an axis, a one-piece cover member connecting said operating element and said drive element together and for permitting relative radial movement in any direction in a plane perpendicular to said axis for self-centering said drive element, said cover member comprising an axially acting resilient endwall for urging at least a portion of said drive element against said annular flange, and at least two leg portions extending from circumferentially spaced anchoring zones on said endwall radially beyond said drive element and connecting said cover member axially to said operating element, said cover endwall having at least two circumferentially spaced support zones axially offset with respect to said anchoring zones, said endwall bearing against said drive element at said support zones only.

2. A clutch release bearing according to claim 1 wherein said support zones on said cover member are formed by median portions of axially resiliently-deformable undulations disposed circumferentially in said endwall of said cover member.

3. A clutch release bearing according to claim 1 wherein support zones in said cover member are formed by free ends of axially resiliently-deformable tongues disposed circumferentially in said endwall of the cover member.

4. A clutch release bearing according to claim 1 wherein said leg portions alternate circumferentially with gaps.

5. A clutch release bearing according to claim 3 wherein close to their free ends the axial leg portions of said cover member each have a cutout receiving in engagement a fastening claw connected to said operating element.

6. A clutch release bearing according to claim 5 wherein at least one of said fastening claws is at least partly bent over axially away from said drive element.

7. A clutch release bearing according to claim 4 wherein the free ends of said leg portions on said cover member are at least partly bent over radially away from the axis of said clutch release bearing.

8. A clutch release bearing according to claim 4 wherein the free ends of said leg portions of the cover are at least partly bent over radially toward the axis of said clutch release bearing.

9. A clutch release bearing according to claim 1 wherein close to their free ends said leg portions of said cover member have elastically deformable tongues which project obliquely, extending toward said endwall of said cover member for cooperation with a fastening surface connected to said operating element.

10. A clutch release bearing according to claim 9 wherein said leg portions of said cover member carry resiliently deformable tongues close to their free ends.

11. A clutch release bearing according to claim 1 wherein at their free ends said leg portions of said cover member each have at least two slots adapted for bayonet connection with said operating element.

12. A clutch release bearing according to claim 1 wherein said leg portions of said cover members have slots for effecting a bayonet connection, each said leg portion extending from one said anchoring and on said endwall.

13. A clutch release bearing according to claim 1 wherein the radially extending flange on said operating element is provided with a reinforcement plate on its face remote from said drive element, wherein said reinforcement plate has extensions which project radially beyond said flange for connection with said cover member.

14. A clutch release bearing according to claim 13 wherein the extensions from said reinforcement plate also project axially toward said endwall of said cover member.

15. A clutch release bearing according to claim 1 wherein the leg portions of said cover member are provided with wings radially extending away from the axis of said clutch release bearing for permanently maintaining thereon a spring adapted to fasten said release bearing to the associated clutch control means.

16. A clutch release bearing according to claim 15 in which said radially extending flange on said operating element is provided with a reinforcement plate on its face facing away from said drive element; said wings of said cover member cooperate with radial wings formed on said reinforcement plate in order to retain said spring.

17. A clutch release bearing according to claim 1 wherein said support zones circumferentially alternate with said anchoring zones.

18. A clutch release bearing according to claim 1 wherein said support zones comprise a relatively small part of the circumference of said endwall.

19. A clutch release bearing according to claim 1 wherein said cover member is made of metal.

20. A clutch release bearing according to claim 1 wherein said support zones are in substantially radial line contact with said drive member.

21. A clutch release bearing having an axis and comprising an operating element having means for cooperation with clutch control means and having a radially extending annular flange, a drive element having means for cooperation with a clutch release member and having a generally transverse surface remote from said annular flange, a one-piece resilient connecting member connecting said operating element and said drive element together and for permitting relative radial movement in any direction in a plane perpendicular to the axis of said clutch release bearing for self-centering of said drive element, said resilient connecting member comprising an annular endwall for urging said drive element against said annular flange of said operating element, said endwall having circumferentially spaced and alternating support zones and anchoring zones, generally axially extending tabs extending from said anchoring zones radially beyond said drive element, said tabs having clipping means near their free ends remote from said endwall cooperating with means fixed axially relative to said operating element, said support zones being axially offset with respect to said anchoring zones with said endwall bearing only by said support zones against said generally transverse surface on said drive element and defining substantially radial line contact between said support zones and said generally transverse surface on said drive element.

22. A clutch release bearing according to claim 21 wherein said generally transverse surface is located on a race of a roller bearing which forms part of said drive element.

* * * * *